United States Patent [19]

Pengwu

[11] Patent Number: 5,764,851

[45] Date of Patent: Jun. 9, 1998

[54] FAST SPEECH RECOGNITION METHOD FOR MANDARIN WORDS

[75] Inventor: Chung-Mou Pengwu, Taipei, Taiwan

[73] Assignee: Industrial Technology Research Institute, Hsinchu, Taiwan

[21] Appl. No.: 685,733

[22] Filed: Jul. 24, 1996

[51] Int. Cl.[6] .................................................. G10L 9/06

[52] U.S. Cl. .................... 395/2.51; 395/2.4; 395/2.49; 395/2.51; 395/2.65

[58] Field of Search ................................. 395/2.4, 2.49, 395/2.51, 2.6, 2.65

[56] References Cited

U.S. PATENT DOCUMENTS

| | | | |
|---|---|---|---|
| 4,777,600 | 10/1988 | Saito et al. | 395/797 |
| 4,975,957 | 12/1990 | Ichikawa et al. | 395/2.29 |
| 5,526,259 | 6/1996 | Kaji | 395/753 |
| 5,627,939 | 5/1997 | Huang et al. | 395/2.65 |
| 5,633,984 | 5/1997 | Aso et al. | 395/2.69 |

OTHER PUBLICATIONS

Hon et al. "Towards Large Vocabulary Mandarin Chinese Speech Recognition." ICASSP '94: Acoustics, Speech & Signal Processing Conference, vol. I, 1994.

Chen et al. "large Vocabulary Word Recognition Based on Tree–Trellis Search." ICASSP '94: Acoustics, Speech & Signal Processing Conference, vol. II, 1994.

Chang et al. "Isolated Mandarin Syllable Recognition Segmental Features." IEE Proceeding—Vision, Image and Signal Processing, vol. 142, No. 1, Feb. 1995.

Wang et al. "Complete Recognition of Continuous Mandarin Speech for Chinese Language With Very Large Vocabulary But Limited Training Data." ICASSP '95: Acoustics, Speech & Signal Processing Conference, vol. I, 1995.

*Primary Examiner*—Allen R. MacDonald
*Assistant Examiner*—Alphonso A. Collins
*Attorney, Agent, or Firm*—W. Wayne Liauh

[57] ABSTRACT

A method for fast speech recognition of Mandarin words is accomplished by obtaining a first database which is a vocabulary of N Mandarin phrases. The vocabulary is described by an acoustic model which is formed by concatenating together word models. Each of the so concatenated word models is a concatenation of an initial model and a final model, wherein the initial model may be a null element, and both the initial and final model are represented by a probability model. A second database which contains initial models is determined. A preliminary logarithmic probability is subsequently calculated. A sub-set of vocabulary comprising acoustic models having the highest probability of occupance are established using the preliminary logarithmic probabilities. This facilitates recognizing phrases of Mandarin phrases which are then outputted to a user.

20 Claims, 2 Drawing Sheets

FAST SPEECH RECOGNITION METHOD FOR MANDARIN WORDS

FIELD OF THE INVENTION

The present invention relates to a fast speech recognition method for Mandarin words. More specifically, the present invention relates to an improved speech recognition method for Mandarin/Chinese words which is based on hidden Markov models.

BACKGROUND OF THE INVENTION

With the advancement and increased popularity of computer technology, many speech recognition strategies have been proposed and tested. With all the development efforts, however, speech recognition is still considered as being one of the more difficult problems in artificial intelligence and computer science.

Voice input to computers presents a number of distinct advantages, most notably the provision of a natural, fast, hands-free, eyes-free, location-free input medium. However, there still exist many problems that prevent routine use of speech as an input device; these include relatively high cost, lack of real time response, speaker dependence, lack of robustness to variations such as noise, speech rate and loudness, lack of ability to handle non-grammatical speech, etc. Voice input via speech recognition provides a more attractive option for the Mandarin language (which is the official dialect of the Chinese language), because Mandarin is not an alphabet-based language (nor are other Chinese dialects), and it is substantially more cumbersome to enter the Mandarin characters than an alphabet-based language such as the English language. However, the problems mentioned above become more pronounced for Mandarin words because many of the "initial sounds" (equivalent to the consonants in the English language) often are either omitted by the speakers or are habitually rendered unintelligible by many Mandarin speakers.

SUMMARY OF THE INVENTION

The primary object of the present invention is to develop an improved speech recognition method for Mandarin words. More specifically, the primary object of the present invention is to develop a fast, preferably with real-time speed, speech recognition method for Mandarin/Chinese words which is based on hidden Markov models.

Several speech recognitions have been proposed which have exhibited impressive accuracy. These include the method of dynamic time warp of non-linear alignment by Itakura of NTT; the DRAGON system of Carnegie-Mellon University (stochastic modeling for all knowledge sources); the HEARSAY system of Carnegie-Mellon University (utilizing a blackboard structure through which all knowledge sources communicate); the HAPPY system of Carnegie-Mellon University (combining the advantages of DRAGON and HEARSAY and using network representation and beam search to improve the efficiency of the search); the Wilpon system of Bell Labs (using clustering techniques to create robust templates for speaker-independent isolated-word recognition); the FEATURE system of Carnegie-Mellon University (using a feature-based approach which led to a speaker-indepent system capable of recognizing isolated English letters with an accuracy over 90%, without grammar); the Tangora of IBM (using a natural very-large-vocabulary task); the BYBLOS system of BBN (applying context-dependent modeling of phonemes); and the Rabiner system of Bell Labs (using continuous hidden Markov model technology with multiple models and mixtures). Some of the advantages and constrains of these technologies have been discussed by Kai-Fu Lee. See "Automatic Speech Recognition: The Development of the SHPHINX System," Kluwer Academic Publishers (1989). The content thereof is incorporated herein by reference. Lee also discussed in detail the method of using the hidden Markov model for speech recognition.

The hidden Markov model has been successfully utilized for speech recognition of Mandarin words. However, most of the prior art studies have been conducted on relatively powerful computers, particularly mainframe computers. Direct use of the hidden Markov model for recognizing Mandarin words with a relatively large vocabulary on lower end computers, such as personal computers, has met difficulties because of the low computing speed. In the present invention, it was discovered that, when the hidden Markov model is utilized in a novel two-stage approach, excellent results, including high accuracy and fast speed, could be obtained.

The basic sound unit of the Mandarin language (typically described as a syllable) comprises an initial unit (equivalent to consonant) and a final unit (equivalent to vowel). A Mandarin words comprises a sequence of basic sound units. During speech recognition, the speech signal A is first represented by a sequence of characteristic vectors. For example, the speech signal "A" can be represented as $A = X_1 X_2 \ldots X_t \ldots X_T$, wherein $X_t$ is a characteristic vector ("frame") and T is the signal length or the "total frame number" of the sound.

The hidden Markov model utilizes statistical expressions to describe speech signals. In the hidden Markov model, speech signals are described as being generated according a certain probability distribution. The probability distribution itself can be gradually changed as a function of time. In other words, a speech signal is represented as one probability distribution at one time (or stage), but can be changed to another probability distribution at another time. This stage is described as "state" in the hidden Markov model. Each state "i" corresponds to a signal generating probability distribution $b_i(X_t)$, this is designated as the output observation probability. The transition from state "i" to state "j" is described by a state transition probability $a_{ij}$. Thus a hidden Markov model is, in essence, a collection of states connected by transitions. Each transition carries two sets of probabilities: a state transition probability, which provides the probability of taking this transition, and an output observation probability, which defines the probability of emitting each output symbol from a finite alphabet given that a transition is taken. The details of the hidden Markov model are described in the treatise by L. R. Rabiner and B. H. Juang: "An Introduction to Hidden Markov Models," IEEE ASSP Magazine (January 1986). The content thereof is incorporated herein by reference. Thus it will not be repeated here.

In the method disclosed in the present invention, a vocabulary consisting of N phrases is first established. This vocabulary is described as $W = \{W_1, W_2, \ldots W_N\}$. The length of phrase $W_i$ (i.e., the number of words constituting the phrase $W_i$) is described as $|W_i| = l_i$. In the present invention $W_i$ is described by an acoustic model $M_i$, which is formed by concatenating word models of $\{C_1, C_2, C_3 \ldots\}$. That is, $M_i = C_{i1} C_{i2} \ldots C_{il_{W_i}}$. Each word model $C_i$ is a concatenation of an initial model $m^I_j$ and a final model $m^F_k$, i.e., $C_i = [m^I_j] m^F_k$. The model is bracketed, indicating that it may be omitted or rendered unintelligible by the speaker. In the present invention, both the initial and final models are presented by a hidden Markov model. The procedure for representing a sound model using hidden Markov model has been described in the same treatise by L. R. Rabiner et al as discussed above, and it will not be repeated here.

During the speech recognition, the input speech signal is designated as A, assuming A is the correct pronunciation of phrase $W_j$, the task of speech recognition is to find $W_j$ in the vocabulary W. In the present invention, a full search procedure is developed by which the probability of each acoustic model $M_i$ (i=1, 2, . . . , N) in the vocabulary W to be the sound of A, i.e., Prob (A|$M_i$), i=1,2 . . . , N, is calculated. From these calculated probability values, the phrase $W_k$ corresponding to maximum probability is found:

$$k = arg_i Max(Prob)(A|M_i))$$

The input speech signal "A" is then recognized as $W_k$. In these calculations, $M_i$ (i=1, 2, . . . , N) is a from-left-to-right hidden Markov model with s states and $A = X_1 X_2 \ldots X_t \ldots X_T$. The maximum probability of a signal via an optimum state (i.e., the maximum likelihood of a speech signal being represented by an hidden Markov accoustic model) can be calculated from the well-known Viterbi algorithm. The details of implementing Viterbi algorithm is described in the same treatise by L. R. Rabiner and B. H. Juang: "An Introduction to Hidden Markov Models," IEEE ASSP Magazine (January 1986). Thus it will not be repeated.

The procedure described above is designated as a "full search" procedure. In this procedure, all the acoustic models will be compared with the input speech signal. This procedure becomes very time consuming when the size of the vocabulary becomes large.

In the present invention, a novel preliminary screening procedure based on two unique sets of models is developed which will be performed preceeding the full search procedure, and the full search procedure is performed based on a substantially reduced sub-set of the entire vocabulary. (In the present invention, the two sets of models collectively constitute a reference database associated with the preliminary screening procedure; this type of database, which contains mathematical models, should be distinguished from the more conventionally accepted definition of "database", which typically stores standard sound signals and constitutes the "vocabulary" used in the present invention.) In this procedure, which is summarized as a flowchart in FIG. 1, the input speech signal is first segmented into 1 syllable segments, each segment contains an initial and a final sub-segment; however the initial sub-segment may be absent. This step can be summarized by the following equation:

$$A = ([s^1{}_1]s^F{}_1)([s^I{}_2]s^F{}_2) \ldots ([s^I{}_1]s^F{}_1)$$

wherein A is the input speech signal, $s^I{}_i$ (i=1, 2, . . . , l) is the ith initial syllable sub-segment, and $s^F{}_i$ (i=1,2, . . . , l) is the ith final syllable sub-segment. The brackets enclosing the initial syllable sub-segment indicating that the initial syllable sub-segment may be missing.

As described earlier, in the present invention, each word model $C_i$ is a concatenation of an initial model $m^I{}_j$ and a final model $m^F{}_k$, i.e., $C_i = [m^I{}_j] m^F{}_k$. Thus the preliminary screening procedure disclosed in the present invention involves a reference database, which comprises J initial models, $m^I{}_j$ (j= 1,2 . . . , J), and K final models $m^F{}_k$ (k=1,2, . . . , K). The next step is to compute log Prob $(s^I{}_i|m^I{}_j)$ and log Prob $(s^F{}_i|m^F{}_k)$, for all the sub-segments (i.e., i=1,2, . . . , l), and for all the initial and final models $m^I{}_j$, $m^F{}_k$ (i.e., j=1,2, . . . , J, and k=1,2, . . . , K, respectively).

In the present invention, each word $W_n$ in W with length l is represented by an acoustic model $M_n (=[m^I{}_{j1}]m^F{}_{k1}|m^I{}_{j2}| m^F{}_{k2} \ldots |m^I{}_{jl}]m^F{}_{kl})$. The next step is to calculate a preliminary logarithmic probability log Prob $(W_n)$ according to the following formula:

$$\log Prob(W_n) = \sum_{i=1}^{l} (\log Prob(s_i^I|m_{ji}^I) + \log Prob(s_i^F|m_{ki}^F))$$

For Mandarin words, it is possible that the input speech signal A may be segmented into other l's (i.e., other number of syllable segments). If this is the case, then a different l is selected and the above preliminary screening procedure is repeated until all the possible l's are exhausted. After all the log Prob($W_n$)'s are calculated, the words with the top X values of log Prob($W_n$)'s are selected and designated as W'$_i$, i=1,2, . . . X, which are represented by acoustic models M'$_i$, i=1,2, . . . X, respectively. These X words with the largest log Prob($W_n$) are then subject to full search procedure as described above. However, a substantially reduced sub-set of the original vocabulary W' (now with K phrases) will be searched, instead of the original vocabulary W (with N phrases).

During the full search procedure, the probabilities of A|M'$_i$ (i=1, 2, . . . X) are calculated. The input speech signal is then recognized as the word with the maximum probability. That is, during the full search step, A is recognized as W'$_x$, wherein $$x = arg_i Max(Prob(A|M'_i)), i=1,2, \ldots X$$

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

The present invention discloses an improve speech recognition method for Mandarin words based on probability models. The method discloses in the present invention involves two different reference databases, both of which are based on hidden Markov models. The present invention also discloses a novel two-stage procedure, each stage utilizing one of the two reference databases, respectively, to provide a fast, with real-time or near-real-time performance, speech recognition method for Mandarin/Chinese words.

In the method disclosed in the present invention, prior to the execution of the speech recognition procedure, a vocabulary W consisting of N phrases is first established. This vocabulary is described as $$W = \{W_1, W_2, \ldots W_N\}$$

The length of a constituent phrase $W_i$ (i can be 1 from N) in the vocabulary W is described as $|W_i|=l_i$. In the Mandarin language, a phrase consists of one or more words, which constitute the basic unit. In the present invention, $W_i$ is described by an acoustic model $M_i$ which is formed by concatenating word models of $\{C_1, C_2, C_3 \ldots\}$. That is, $$M_i = C_{i1} C_{i2} \ldots C_{i|W_i|}$$

Wherein $|W_i|$ is the number of word models constituting the acoustic model $M_i$.

In the present invention, each word model $C_i$ is a concatenation of an initial model $m'_j$ and a final model $m^F_k$, i.e., $$C_i = [m'_j] m^F_k$$

The initial model is bracketed, indicating that it may be missing (i.e., mathematically inaudible). In the present invention, both the initial and final models are presented by a hidden Markov model. The above procedure establishes the reference database which will be utilized in the speech recognition step of the present invention.

During the speech recognition, the input speech signal is designated as A. The task of speech recognition is to find $W_j$ in the vocabulary W such that A is the correct pronunciation of phrase $W_j$.

Figure 1:
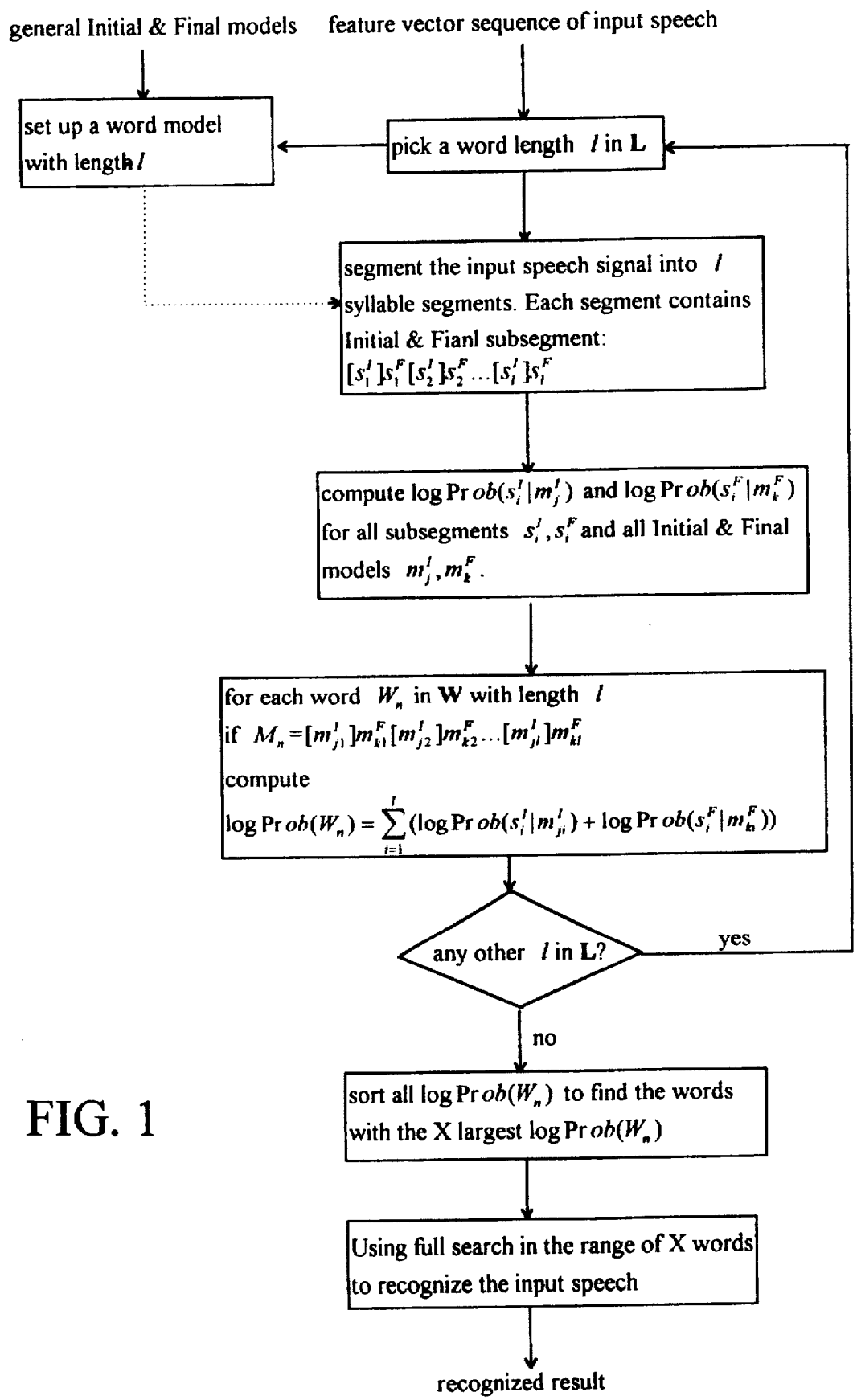
FIG. 1 is a schematic flowchart diagram illustrating the two-stage fast speech recognition process for Mandarin words disclosed in the present invention which utilizes hidden Markov models.

In the present invention, a novel two-step process is developed which utilizes the hidden Markov model for speech recognition of Mandarin words. Two reference databases are developed, one comprises the accoustic models of all the phrases contained in a vocabulary and other comprises only initial and final sound models. The two-step process disclosed in the present invention includes a preliminary screening procedure utilizing the database of initial and final sound models, and a subsequent fill search procedure utilizing a substantially reduced subset of the vocabulary database. FIG. 1 is a flowchart showing the steps involved in the preliminary screening procedure. In this procedure, the input speech signal is first segmented into l syllable segments, each segment containing an initial and a final sub-segment; however the initial sub-segment may be absent. This step can be summarized by the following equation:

$$A = ([s'_1] s^F_1)([s'_2] s^F_2) \ldots ([s'_l] s^F_l)$$

wherein A is the input speech signal, $s'_i$ (i=1, 2, ..., l) is the ith initial syllable sub-segment, and $s^F_i$ (i=1, 2, ..., l) is the ith final syllable sub-segment. The brackets enclosing the initial syllable sub-segment indicating that the initial syllable sub-segment may be missing. In this procedure, the segmentation into the initial and final sub-segments is again carried out using the Viterbi algorithm. However, the models used in the above described embodiment of the present invention involve two general initial and final models which have the same structure as the specific initial and final models, except that the distribution of output probability for each state is calculated by combing all the distributions of the corresponding states of the specific models.

As described earlier, in the present invention, each word model $C_i$ is a concatenation of an initial model $m'_j$ and a final model $m^F_k$, i.e., $C_i = [m'_j] m^F_k$. Thus the first step of the present invention includes a reference database, which comprises J initial models, $m'_j$ (j=1,2,..., J), and K final models, $m^F_k$ (k=1,2,..., K). The next step is to compute log Prob ($s'_i | m'_j$) and log Prob ($s^F_i | m^F_k$), for all the sub-segments (i.e., i=1, 2, ..., l), and for all the initial and final models $m'_j$, $m^F_k$ (i.e., j=1,2,..., J, and k=1, 2, ..., K, respectively).

In the present invention, each word $W_n$ in W with length l is represented by an acoustic model $M_n (=[m'_{j1}] m^F_{k1} [m'_{j2}] m^F_{k2} \ldots [m'_{jl}] m^F_{kl})$. The next step is to calculate a preliminary logarithmic probability log Prob ($W_n$) for the accoustic model $M_n$, according to the following formula:

$$\log Prob(W_n) = \sum_{i=1}^{l} (\log Prob(s'_i | m'_{ji}) + \log Prob(s^F_i | m^F_{ki}))$$

Figure 2:
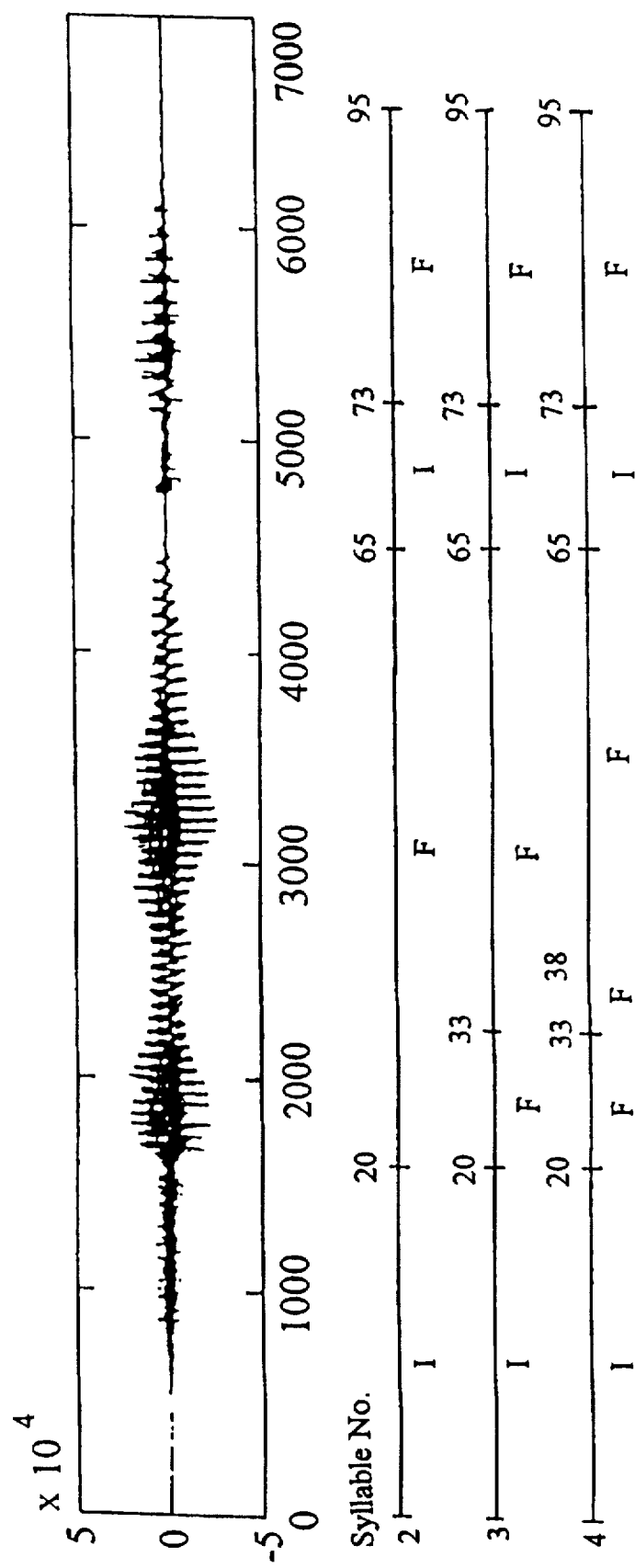
FIG. 2 illustrates the segmentations of the Chinese phrase 飯碗 into 2, 3, and 4 frames.

For Mandarin language, it is possible that the input speech signal A may be segmented into other l's. If this is the case, then a different l is selected and the above preliminary screening procedure is repeated, as shown in FIG. 1, until all the possible l's are exhausted. FIG. 2 illustrates the segmentations of the Chinese phrase 我是 into 2, 3, and 4 syllable segments, or frames.

After all the logProb($W_n$)'s are calculated, the words within the top Xth log Prob($W_n$)'s are selected and designated as $W'_i$, i=1,2,... X, which are represented by acoustic models $M'_i$, i=1,2,... X, respectively. These X words with the largest values of log Prob($W_n$) are then subject to second step full search procedure of the two-step process of the present invention.

During the full search procedure, the probabilities of $A | M'_i$ (i=1,2,... K) are calculated. The input speech signal is then recognized as the word with the maximum probability. That is, during the full search step, A is recognized as $W'_x$, wherein $$x = \arg_i \text{Max}(Prob(A|M'_i)), i=1,2,\ldots X$$

A full search procedure may be conducted without the preliminary screening step described above. In this approach, which can be considered as a conventional approach, the probability of each acoustic model $M_i$ (i=1, 2, ..., N) in the vocabulary W to be the sound of A, i.e., Prob ($A|M_i$), i=1,2,..., N, is calculated. From these calculated probability values, the phrase $W_k$ corresponding to maximum probability is found:

$$k = \arg_i \text{Max}(Prob(A|M_i)), i=1,2,\ldots N$$

A is then recognized as $W_k$.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

Reference Databases:

A reference database containing 21 initial units and 36 final units of Mandarin language was established, each unit was characterized by a 3-state hidden Markov model with left-to-right structure where each state was described by continuous probabilities of 4-mixture Gaussian distributions. The parameters in all the initial and final units were estimated using the well-known Baum-Welch procedure. Details of the Baum-Welch procedure have been described in the same treatise by L. R. Rabiner and B. H. Juang: "An Introduction to Hidden Markov Models," IEEE ASSP Magazine (January 1986). Thus it will not be repeated.

The general initial model I and final model F used for segmenting the input speech signal is respectively combined by the 21 specific initial models and 36 specific final models as described above. The general models have the same structure (3-state, left-to-right) as the specific models. During the calculations, the output probability for each state i of the general initial model was designated as $B^I_k(O_i)$, and that of the specific initial model was designated as $b_i{}^j(O_i)$, where j (=1,2, . . . , or 21) is the index of the specific initial model. Likewise, the output probability for each state i of the general final model was designated as $B^F_i(O_i)$, and that of the specific final model was designated as $b^{-k}{}_i(O_i)$, where k (=1, 2, . . . , or 36) is the index of the specific final model. The values of $B^I_k(O_i)$ and $B^F_i(O_i)$ are calculated by combining the specific initial and final models, respectively according to the following formula:

$$B^I_k(O_i) = \text{Max}_j b_i{}^j(O_i), j=1,2, \ldots 21$$

$$B^F_k(O_i) = \text{Max}_k b^{-k}{}_i(O_i), k=1,2, \ldots 36$$

Since the transition probabilities was tested to exhibit little influence on the segmentation results, they were simply chosen from the transition probabilities of any one of the specific models. Source codes describing the calculational procedure are enclosed in the appendix.

Three Mandarin vocabularies containing 100, 480, and 945 Mandarin phrases, respectively, were also established. Each Mandarin phrase is a concatenation of one or more Mandarin words, and each Mandarin word is represented by a model $C_i$, which is a concatenation of an initial model $m^I_j$ and a final model $m^F_k$, as described above.

Computation Times

A SUN workstation SPARC 10 was used in the speech recognition experiments. Table 1 compares the CPU times calculated using a full search (convention approach), and the two-stage process disclosed in the present invention.

TABLE 1

|  |  | This Invention | | |
| --- | --- | --- | --- | --- |
| Vocabulary Size (N) | Full Search | K = 10 | K = 20 | K = 30 |
| 945 | 0.096750 | 0.043752 | 0.045630 | 0.046557 |
| 480 | 0.072973 | 0.043605 | 0.044246 | 0.045242 |
| 100 | 0.051507 | 0.043605 | 0.043999 | 0.045533 |

Table 1 shows that the CPU required for the present invention is substantially shorter than that required for the full search process, and is almost independent of the size of the vocabulary. Thus the method disclosed in the present invention is particularly useful for large Mandarin vocabularies.

Recognition Accuracy

In one study, 479 Mandrain phrases spoken by three male voices (M1, M2, and M3) were input and recognized using a 480-phrase reference database. Results are analyzed based on each individual male voice and are summarized in Tables 2–4 below.

TABLE 2

| M1 | Number of Incorrect Recognitions | Error Rate (%) |
| --- | --- | --- |
| Full Search | 52 | 10.86 |
| This Invention |  |  |
| X = 10 | 64 | 13.36 |
| X = 20 | 63 | 13.15 |
| X = 30 | 62 | 12.94 |
| X = 40 | 60 | 12.53 |

TABLE 2-continued

| M1 | Number of Incorrect Recognitions | Error Rate (%) |
| --- | --- | --- |
| X = 50 | 58 | 12.11 |

TABLE 3

| M2 | Number of Incorrect Recognitions | Error Rate (%) |
| --- | --- | --- |
| Full Search | 11 | 2.30 |
| This Invention |  |  |
| X = 10 | 16 | 3.34 |
| X = 20 | 15 | 3.13 |
| X = 30 | 15 | 3.13 |
| X = 40 | 14 | 2.92 |
| X = 50 | 14 | 2.92 |

TABLE 4

| M3 | Number of Incorrect Recognitions | Error Rate (%) |
| --- | --- | --- |
| Full Search | 50 | 10.44 |
| This Invention |  |  |
| X = 10 | 49 | 10.23 |
| X = 20 | 47 | 9.81 |
| X = 30 | 47 | 9.81 |
| X = 40 | 48 | 10.02 |
| X = 50 | 49 | 10.23 |

In another study, 100 Mandrain phrases spoken by the same male voice were input and recognized using a 100-Mandrain phrase reference database. Results are analyzed and summarized in Table 5 below.

TABLE 5

|  | Number of Incorrect Recognitions | Error Rate (%) |
| --- | --- | --- |
| Full Search | 5 | 5 |
| This Invention |  |  |
| X = 10 | 6 | 6 |
| X = 20 | 6 | 6 |
| X = 30 | 6 | 6 |

Tables 2–5 illustrate that the two-stage process disclosed in the present invention provides essentially the same accuracy as that obtained from full search. However, the present invention allows speech recongntion to be conducted at a much faster speed. It should be noted that, as it was discussed above, direct use of the hidden Markov model for Mandrain speech recognition would result in an unacceptably low speed on a PC when a large vocabulary was utilized. The present invention, which utilizes a novel two-step approach, greatly extended the applicability of the hidden Markov model for fast and accurate speech recognition of Mandrain words using commodity computers.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

```
/****************************************************************/
/* Fast recognizing Mandarin phrases with two stages.           */
/* 1st stage: narrowing down the search range of phrase list    */
/*            to X ,say 10~50, candidates, which is the output  */
/*            of subroutine Get_Candidates()                    */
/* 2nd stage: perform exhaustive search to X phrases.           */
/* required files: 1. file containing number of models and a    */
/*                    list of model names.                      */
/*                 2. files containing HMM description, one     */
/*                    model one file.                           */
/*                 3. file containing a list of phrases and     */
/*                    corresponding model sequence.             */
/*                 4. file containing a list of files which     */
/*                    storing input speech signals to           */
/*                    recognized.                               */
/* compile: cc -o recogFast recogFast.c -lm                     */
/* usage: recogFast <the 4th required files>                    */
/****************************************************************/
#include <stdio.h>
include <math.h> define    Num_State          5
define    Max_Frame_Num      300
#define    Vec_Size           24
#define    Small              -1.0e30
#define    Max_Stage          4
#define    Max_Model_Num      58
#define    Max_Mix            4
#define    Ini_Num            21  /* total number of INITIALs */
#define    Max_Name_Num       120
#define    Nbest    10
#define    Ntop     5
#define    Max(x,y)    ((x)>(y)?(x):(y))

struct Model_struct{
                int     State;
                int     Phone_ID;
                float   Mean[Num_State][Max_Mix][Vec_Size];
                float   Var[Num_State][Max_Mix][Vec_Size];
                float   Trans[Num_State][Num_State];
                float   GConst[Num_State][Max_Mix];
                float   Mix_Weight[Num_State][Max_Mix];
                int     Mix[Num_State];
                } ;
struct Model_struct     *Model;

struct list_type {
         int    id;
         float  prob;
};
struct list_type    s_ls[30];

struct IdxType  {
         int cnt;
         int name_seq[Max_Name_Num];
};
struct IdxType idx[3][Max_Model_Num][Max_Stage];

float           Cep_Data[Max_Frame_Num][Vec_Size];    /* speech data */
float           B_O[Max_Frame_Num][Max_Model_Num][5];
float           BO4IF[Max_Frame_Num][2][Num_State];
float           modelProbIn[2][Max_Stage][Max_Frame_Num],
                modelProbOut[2][Max_Stage][Max_Frame_Num];
float           Seq_Accu[3][Max_Name_Num];
```

```
                          modelOutbkpt[2][Max_Stage][Max_Frame_Num],
                          fromModel[Max_Frame_Num];
int           Total_HMM,Total_Frame,Last_Frame;
int           Total_Name[3],mapSeq[3][Max_Name_Num];
int           m4trans[2];
int           Seq_Model[Max_Name_Num][Max_Stage][2];
int           CandName[Nbest];
char          Pho_Model[Max_Model_Num][4];
char          Seq_Name[Max_Name_Num][10];

main(argc, argv)
int argc;
char *argv[];
{
  FILE    *F_Recog, *fp_list;
  int     i,j;
  char    ch, fname[80];

if (argc != 2)
  { fprintf(stderr,"Usage: recog listfile\n");
    exit(1);
  } if ((F_Recog = fopen("models","r"))==NULL)
  {
    printf("Open file models error!\n");
    exit(1);
  }
  fscanf(F_Recog,"%ld ",&Total_HMM);

if ((Model=(struct Model_struct *)malloc(Total_HMM*sizeof(struct
      Model_struct)))==NULL)
  {
    printf("HMM Memory allocation error !\n");
    exit(1);
  }         /* Allocate memory for HMMs */ for (i=0;i<Total_HMM;i++)
  {
    fscanf(F_Recog,"%s ",Pho_Model[i]);
    if (Match_ID(Pho_Model[i])==-1)
    {
      printf("Unknown model %s\n",Pho_Model[i]);
      exit(1);
    }
    Read_Hmm(Pho_Model[i],(Model+i));
  }
  fclose(F_Recog);

Get_Index();

if ((fp_list = fopen(argv[1],"r")) == NULL)
  { perror("Error opening listfile");
    exit(1); }
  while (fscanf(fp_list,"%s",fname) > 0 )
  {
    Feature(fname);   /* check ok */
    printf("%s\n",fname);
    Get_all_BO();
    Get_Candidates();
/*
    for (i=0; i < Nbest; i++)
    { j = s_ls[i].id;
```

```
        }
*/
    for (i=0; i < Nbest; i++) CandName[i] = s_ls[i].id;
    Viterbi();

for (i=0; i < Ntop; i++)
    { j = s_ls[i].id;
      printf("%2d (%3d %s) (%f)\n",i,j,Seq_Name[j],s_ls[i].prob);
    }
  }
  fclose(fp_list);
  return;
}

Read_Hmm(Name ,Model)
char Name[];
struct Model_struct *Model;
{
  char    Tmp[15], Hmm_Name[35];
  FILE    *F_Hmm;
  int     s, dim, i, j, state, Mix_2, Now_Mix;
  float   gg;

sprintf(Hmm_Name,"/home1/e0dec5/HKUdata/peng/RECOGfast/hmmAdap/%s",
  if ((F_Hmm = fopen (Hmm_Name,"rt"))==NULL)
  {
    printf("Open HMM %s error!\n",Hmm_Name);
    exit(1);
  }

Now_Mix = 1;
  for (i=0;i<Num_State;i++)
    Model->Mix[i] = 1;         /* If mix=1, then it will be useful */
  Model->Phone_ID = Match_ID(Name);
  fscanf(F_Hmm, "%s",Tmp);
  while (!feof(F_Hmm))
  {
    if (strcmp(Tmp,"<BeginHMM>")==0) ;
    else if (strcmp(Tmp, "<MFCC_D>")==0) ;
    else if (strcmp(Tmp, "<NULLD>")==0) ;
    else if (strcmp(Tmp, "<DIAGC>")==0) ;
    else if (strcmp(Tmp, "<EndHMM>")==0) break;
    else if (strcmp(Tmp, "<NumStates>")==0)
          {
            fscanf(F_Hmm, "%d ", &state);
            Model->State = state;
          }
    else if (strcmp(Tmp, "<GConst>")==0)
          {
            fscanf(F_Hmm, "%f ",&gg);
            Model->GConst[s-1][Now_Mix-1] = gg;
          }
    else if (strcmp(Tmp, "<VecSize>")==0)
            fscanf(F_Hmm, "%s ",Tmp);
    else if (strcmp(Tmp, "<StreamInfo>")==0)
          {
            fscanf(F_Hmm, "%s ",Tmp);
            fscanf(F_Hmm, "%s ",Tmp);
          }
    else if (strcmp(Tmp, "<State>")==0)
            fscanf(F_Hmm, "%d ", &s);
    else if (strcmp(Tmp, "<Mean>")==0)
```

```
              fscanf(F_Hmm, "%d ", &dim);
              for (i=0;i<Vec_Size;i++)
              {
                fscanf(F_Hmm, "%f ", &gg);
                Model->Mean[s-1][Now_Mix-1][i] = gg;
              }
            }
      else if (strcmp(Tmp, "<Variance>")==0)
            {
              fscanf(F_Hmm, "%d ", &dim);
              for (i=0;i<Vec_Size;i++)
              {
                fscanf(F_Hmm, "%f ", &gg);
                Model->Var[s-1][Now_Mix-1][i] = 1.0/gg;
              }
            }
      else if (strcmp(Tmp, "<TransP>")==0)
            {
              fscanf(F_Hmm, "%s ", Tmp);
              for (i=0;i<state;i++)
                for (j=0;j<state;j++)
                {
                  fscanf(F_Hmm, "%e ", &gg);
                  if (gg <= 0)
                     gg = 1.0e-30;
                  Model->Trans[i][j] = log(gg);
                }
            }
      else if (strcmp(Tmp, "<NumMixes>")==0)
            {
              fscanf(F_Hmm, "%d ",&Mix_2);
              Model->Mix[s-1] = Mix_2;
            }
      else if (strcmp(Tmp, "<Mixture>")==0)
            {
              fscanf(F_Hmm, "%d ",&Now_Mix);
              fscanf(F_Hmm, "%f ",&gg);
              Model->Mix_Weight[s-1][Now_Mix-1] = gg;
            }
      else printf("Idiot %s in %s\n",Tmp,Name);
      fscanf(F_Hmm ,"%s",Tmp);
   }    /* End of while */
   fclose (F_Hmm);
}    /* End of Read_Hmm */ int Match_ID(Name)
char Name[];
{int i,idx;

idx = -1;
   for (i=0; i < Total_HMM; i++)
     if (strcmp(Name,Pho_Model[i]) == 0)
     {  idx = i;  break; }
   if (idx < 0)
   { printf("no such model %s\n",Name);
     exit(1);
   }
   return(idx);
}       /* End of Match ID */

Get_Index()
{
   FILE *File_Idx;
```

```
    char name[10],mname[4];
    int model_no,stage_no;

if ((File_Idx = fopen("name4demo.100M","rt")) == NULL)
    { perror("Error opening namelist file");
      exit(1); } for (stg=0; stg < 3; stg++)
    { for (m=0; m < Total_HMM; m++)
        for (s=0; s < Max_Stage; s++) idx[stg][m][s].cnt = 0;
      Total_Name[stg] = 0;
    }
    n = 0;
    while(fscanf(File_Idx,"%d %s",&dump,name) > 0)
    { strcpy(Seq_Name[n],name);
      model_no = strlen(name);
      stage_no = model_no/2;
      stg = stage_no-2;
      for (s=0; s < stage_no; s++)
      { for (i=0; i < 2; i++)
        { fscanf(File_Idx,"%s",mname);
          m = Match_ID(mname);
          Seq_Model[n][s][i] = m;
          idx[stg][m][s].name_seq[idx[stg][m][s].cnt] = Total_Name[stg];
          idx[stg][m][s].cnt++;
        }
      }
      fscanf(File_Idx," -1\n");
      mapSeq[stg][Total_Name[stg]] = n;
      Total_Name[stg]++;

n++;
    }
    fclose(File_Idx);
/*
    for (stg=0; stg < 3; stg++)
    { printf("%d %d\n",stg,Total_Name[stg]);
      for (n=0; n < Total_Name[stg]; n++)
        printf("%3d %3d\n",n,mapSeq[stg][n]);
    }
    for (stg=0; stg < 3; stg++)
    { for (m=0; m < Total_HMM; m++)
      { printf("%s\n",Pho_Model[m]);
        for (s=0; s < stg+2; s++)
        { printf("stage=%1d,%3d ",s,idx[stg][m][s].cnt);
          if (idx[stg][m][s].cnt > 0)
          { for (i=0; i < idx[stg][m][s].cnt; i++)
              printf("%3d ",idx[stg][m][s].name_seq[i]);
            printf("\n");
          }
          else printf("\n");
        }
      }
    }
*/
    return;
}

Feature(cepfile)
char *cepfile;
{ int k;
  FILE *fp_in;
```

```
    { perror("Error opening cepfile");
      exit(1); } k=0;
    fseek( fp_in, 12L , 0 );
    while ((fread(Cep_Data[k],sizeof(float),24L,fp_in)) > 0)
      k++;
    Total_Frame = k;

fclose(fp_in);
    return 0;
}

Get_all_BO()
{ int i,s,t;
  double max;

for (t=0; t < Total_Frame; t++)
  { for (s=1; s < Num_State-1; s++)      /* state=1,2,3 */
    { max = Small;                        /* for INITIALs */
      for (i=1; i <= Ini_Num; i++)
      { Get_B(t,i,s);
        if (B_O[t][i][s] > max) max = B_O[t][i][s];
      }
      BO4IF[t][0][s] = max;

max = Small;                        /* for FINALs */
      for (i=Ini_Num+1; i < Total_HMM; i++)
      { Get_B(t,i,s);
        if (B_O[t][i][s] > max) max = B_O[t][i][s];
      }
      BO4IF[t][1][s] = max;
    }
    Get_B(t,0,1);
    BO4IF[t][0][1] = Max(BO4IF[t][0][1],B_O[t][0][1]);
  }
  /* use any INITIAL and FINAL for transition prob. used later */
  m4trans[0] = 1;
  m4trans[1] = 22;
  return;
}

Get_B(i, j, k)   /* i:frame num , j:model num, k: state num */
int i,j,k;
{
  float    diff[Max_Mix];
  double   MAX;
  int      m, n;

MAX = 1.0e30;
  for (m=0;m<Model[j].Mix[k];m++)
  {
    diff[m] = 0.0;
    for (n=0;n<Vec_Size;n++)
      diff[m] += (Cep_Data[i][n]-Model[j].Mean[k][m][n])*
                 (Cep_Data[i][n]-Model[j].Mean[k][m][n])*
                  Model[j].Var[k][m][n];
    if (Model[j].Mix[k]>1)
    {
      if ((Model[j].GConst[k][m]+diff[m])<MAX)
        MAX = Model[j].GConst[k][m]+diff[m];
    }
    else
```

```
    B_O[i][j][k] = MAX*(-0.5);
  }     /* End of ALL Observation probility Computing */
Get_Candidates()
{ int stage,mtype,t,k,s,m,n,nn;
  int curn_stage,curn_frame,curn_model,code;
  float Delta,Accum;
  int seg[Max_Stage][2],segNo,begf,endf,total;

for (stage=0; stage < Max_Stage; stage++)
  { for (mtype=0; mtype < 2; mtype++) /* mtype=0:INITIAL+Sil, 1:FINAL */
    { get_model_in(stage,mtype); /* get modelProbIn,modelInbkpt */
      get_model_out(stage,mtype);/* get modelProbOut,modelOutbkpt */
    }
  }
  for (s=0; s < Max_Stage-1; s++)
      for (n=0; n < Total_Name[s]; n++) Seq_Accu[s][n] = 0.0;
  for (n=0; n < Nbest; n++) s_ls[n].prob = -100000000.0;
  /* backtracking for stage No.=1,2,...,Max_Stage-1 */
  for (s=1; s < Max_Stage; s++)
  { /*silence may follow the last FINAL */
    Delta = B_O[0][0][1];
    for (t=1; t < Total_Frame; t++)
    { Accum = Delta+Model[0].Trans[1][1];
      if (Accum > modelProbOut[1][s][t-1])
      { Delta = Accum+B_O[t][0][1];
        fromModel[t] = 0;
      }
      else
      { Delta = modelProbOut[1][s][t-1]+B_O[t][0][1];
        fromModel[t] = 1;
      }
    }
    if (Delta > modelProbOut[1][s][Total_Frame-1])
    { t = Total_Frame-1;
      while(fromModel[t] == 0) t--;
      Last_Frame = t-1;
    }
    else Last_Frame = Total_Frame-1;
    curn_frame = Last_Frame;

printf("Total Stage =%d, accum. prob.=%e\n",
                       s+1,modelProbOut[1][s][curn_frame]);
/*
    printf("Total_Frame=%d,Last_Frame=%d\n",Total_Frame,Last_Frame);
*/
    for (k=0; k <= s; k++)
        for (m=0; m < 2; m++) seg[k][m] = -1;
    curn_model = 1;
    curn_stage = s;
    seg[curn_stage][curn_model] = curn_frame;
    curn_frame = modelOutbkpt[curn_model][curn_stage][curn_frame];
    while(curn_frame > 0)
    { code = modelInbkpt[curn_model][curn_stage][curn_frame];
      curn_model = (code-100)/10;
      curn_stage = (code-100)%10;
      seg[curn_stage][curn_model] = curn_frame;
      curn_frame = modelOutbkpt[curn_model][curn_stage][curn_frame];
    }
/*
    for (k=0; k <= s; k++)
        for (m=0; m < 2; m++) printf("%1d %1d %3d\n",k,m,seg[k][m]);
```

```
*/
    for (k=0; k <= s; k++)
    { if (seg[k][0] > 0)
        { if (k == 0) begf = 0;
          else         begf = seg[k-1][1]+1;
          endf = seg[k][0];
          if ((endf-begf) < 3) endf = endf+1;
/*        printf("stage = %ld,INITIAL from %d to%d\n",k,begf,endf);    */
          getMCandI(begf,endf,k,s);
        }
      if (seg[k][1] >0)
        { if (seg[k][0] > 0) begf = seg[k][0]+1;
          else { if (k==0) begf = 0;
                 else         begf = seg[k-1][1]+1;
               }
          endf = seg[k][1];
          if ((endf-begf) < 3) begf = begf-1;
/*        printf("stage = %ld, FINAL from %d to %d\n",k,begf,endf);    */
          getMCandF(begf,endf,k,s);
        }
    } for (n=0; n < Total_Name[s-1]; n++)
    { nn = mapSeq[s-1][n];
      if (Seq_Accu[s-1][n] != 0.0) sort_prob(Seq_Accu[s-1][n],nn,Nbest);
    }
  }/* end for (s=1;... */ return;
} get_model_in(stg,m)
int stg,m;
{ int t;

if (stg == 0)
  { switch(m)   /* m=0, for INITIAL+Sil, m=1, for FINAL */
    { case 0: for (t=0; t < Total_Frame; t++)
                  modelProbIn[m][stg][t] = Small;
              break;
      case 1: for (t=0; t < Total_Frame; t++)
              { modelProbIn[m][stg][t] = modelProbOut[m-1][stg][t];
                modelInbkpt[m][stg][t] = 100+(m-1)*10+stg;
              }
              break;
    } /* end of awitch */
  }
  else
  { switch(m)
    { case 0: for (t=0; t < Total_Frame; t++)
              { modelProbIn[m][stg][t] = modelProbOut[m+1][stg-1][t];
                modelInbkpt[m][stg][t] = 100+(m+1)*10+stg-1;
              }
              break;
      case 1: for (t=0; t < Total_Frame; t++)
              { if (modelProbOut[m-1][stg][t] > modelProbOut[m][stg-1][t
                  { modelProbIn[m][stg][t] = modelProbOut[m-1][stg][t];
                    modelInbkpt[m][stg][t] = 100+(m-1)*10+stg;
                  }
                  else
                  { modelProbIn[m][stg][t] = modelProbOut[m][stg-1][t];
                    modelInbkpt[m][stg][t] = 100+m*10+stg-1;
                  }
              }
```

```
                    break;
            } /* end of awitch */
        }
        return;
    } get_model_out(stg,m)
    int stg,m;
    { int k,t,state_no;
      short int bkptr[Num_State];
      float Delta[Num_State];
      float Accum0, Accum1;

state_no = 5;
      Delta[0] = modelProbIn[m][stg][0];
      bkptr[0] = 0;
      for (k=1; k < state_no-1; k++)
      { Delta[k] = Small;
        bkptr[k] = -1;
      } if (stg == 0)
      { Delta[1] = BO4IF[0][m][1];
        bkptr[1] = 0;
      }
      for (t=1; t < Total_Frame; t++)
      { for (k=state_no-2; k > 0; k--)  /*for k=3,2,1 */
        { if (bkptr[k-1] >= 0)
          { Accum0 = Delta[k]   + Model[m4trans[m]].Trans[k][k];
            Accum1 = Delta[k-1] + Model[m4trans[m]].Trans[k-1][k];
            if (Accum0 > Accum1)
               Delta[k] = Accum0;
            else
            { Delta[k] = Accum1;
              bkptr[k] = bkptr[k-1];
            }
            Delta[k] += BO4IF[t][m][k];
          }
        }
        Delta[0] = modelProbIn[m][stg][t];
        bkptr[0] = t;

modelProbOut[m][stg][t] = Delta[state_no-2]+
                                  Model[m4trans[m]].Trans[state_no-2][state_
        modelOutbkpt[m][stg][t] = bkptr[state_no-2];
      }
      modelProbOut[m][stg][0] = Small;  /* for t=0 */ return;
    }

/* #define NbestI 10 */
    getMCandI(bf,ef,stg,stgNo)
    int bf,ef,stg,stgNo;
    { int i,k,m,t,s,state_no;
      short int gotB[Num_State];
      float Delta[Num_State],accum0,accum1;

/*   for (i=0; i < NbestI; i++) s_ls[i].prob = -100000000.0;  */
      /* for INITIALs ,silence may be ahead */
      for (m=1; m <= Ini_Num; m++)
      { if (idx[stgNo-1][m][stg].cnt > 0)
        { state_no = Model[m].State;
          for (s=0; s < state_no-1; s++)
```

```
            gotB[s] = 0;
        }
        Delta[0] = B_O[bf][0][1];
        gotB[0] = 1;
        Delta[1] = B_O[bf][m][1];
        gotB[1] = 1;
        for (t=bf+1; t <=ef; t++)
        { for (s=state_no-2; s > 0; s--)   /* for state 3,2,1 */
           { if (gotB[s-1] == 1)
              { accum0 = Delta[s]+Model[m].Trans[s][s];
                accum1 = Delta[s-1]+Model[m].Trans[s-1][s];
                Delta[s] = Max(accum0,accum1);
                Delta[s] += B_O[t][m][s];
                gotB[s] = 1;
              }
           }
           Delta[0] += (Model[0].Trans[1][1]+B_O[t][0][1]); /* for state 0 */
           gotB[0] = 1;
        }
/*      sort_prob(Delta[state_no-2],m,NbestI);   */ for (i=0; i < idx[stgNo-1][m][stg].cnt; i++)
        { k = idx[stgNo-1][m][stg].name_seq[i];
          Seq_Accu[stgNo-1][k] += (Delta[state_no-2]);
        }
      }
    }
    /* for silence only */
    if (idx[stgNo-1][0][stg].cnt > 0)
    { Delta[1] = B_O[bf][0][1];
      for (t=bf+1; t <=ef; t++)
        Delta[1] += (Model[0].Trans[1][1]+B_O[t][0][1]);

for (i=0; i < idx[stgNo-1][0][stg].cnt; i++)
      { k = idx[stgNo-1][0][stg].name_seq[i];
        Seq_Accu[stgNo-1][k] += (Delta[1]);
      }
    }
/*
  sort_prob(Delta[1],0,NbestI);

for (i=0; i < NbestI; i++)
    printf("%2d %s (%f)\n",i,Pho_Model[s_ls[i].id],s_ls[i].prob);
*/
    return;
}

/* #define NbestF 20   */
getMCandF(bf,ef,stg,stgNo)
int bf,ef,stg,stgNo;
{ int i,k,m,t,s,state_no;
  short int gotB[Num_State];
  float Delta[Num_State],accum0,accum1;

/* for (i=0; i < NbestF; i++) s_ls[i].prob = -100000000.0; */
  /* for INITIALs ,silence may be ahead */
  for (m=Ini_Num+1; m < Total_HMM; m++)
  { if (idx[stgNo-1][m][stg].cnt > 0)
    { state_no = Model[m].State;
      for (s=0; s < state_no-1; s++)
      { Delta[s] = Small;
        gotB[s] = 0;
      }
```

```
            gotB[1] = 1;
            for (t=bf+1; t <=ef; t++)
            { for (s=state_no-2; s > 1; s--)   /* for state 3,2 */
                { if (gotB[s-1] == 1)
                    { accum0 = Delta[s]+Model[m].Trans[s][s];
                      accum1 = Delta[s-1]+Model[m].Trans[s-1][s];
                      Delta[s] = Max(accum0,accum1);
                      Delta[s] += B_O[t][m][s];
                      gotB[s] = 1;
                    }
                }
                Delta[1] += (Model[m].Trans[1][1]+B_O[t][m][1]); /* for state 1 */
                gotB[1] = 1;
            }
/*          sort_prob(Delta[state_no-2],m,NbestF);   */
            for (i=0; i < idx[stgNo-1][m][stg].cnt; i++)
            { k = idx[stgNo-1][m][stg].name_seq[i];
              Seq_Accu[stgNo-1][k] += (Delta[state_no-2]);
            }
        }
    }
/*
    for (i=0; i < NbestF; i++)
        printf("%2d %s (%f)\n",i,Pho_Model[s_ls[i].id],s_ls[i].prob);
*/
    return;
}

Viterbi()
{ int    i,j,k,m,n,s,t,stg,sn,mn,sn0,sn1;
  int    stageNo,modelNo[Max_Stage],mId[Max_Stage][3],stateNo[Max_Stage]
  float  Delta[Max_Stage][3][Num_State],SilDelta;
  float  accum0,accum1,Deltaout;

for (i=0; i < Ntop; i++) s_ls[i].prob = -100000000.0;
  for (i=0; i < Nbest;i++)
  { n = CandName[i];
    stageNo = strlen(Seq_Name[n])/2;
    /* inititalization, for t=0 */
    for (stg=0; stg < stageNo; stg++)
    { if (Seq_Model[n][stg][0] == 0)
        { modelNo[stg] =1;
          mId[stg][0] = Seq_Model[n][stg][1];
          stateNo[stg][0] = Model[mId[stg][0]].State;
          mId[stg][1] = 0;
          stateNo[stg][1] = Model[0].State;
        }
      else
      { modelNo[stg] =2;
        for (m=0; m < modelNo[stg]; m++)
        { mId[stg][m] = Seq_Model[n][stg][m];
          stateNo[stg][m] = Model[mId[stg][m]].State;
        }
        mId[stg][2] = 0;
        stateNo[stg][2] = Model[0].State;
      }
      for (m=0; m <= modelNo[stg]; m++)
        for (s=0; s < stateNo[stg][m]; s++)
                Delta[stg][m][s] = Small;
    }
    SilDelta = B_O[0][0][1]+Model[0].Trans[1][2];
    Delta[0][0][0] = SilDelta;
    Delta[0][0][1] = B_O[0][mId[0][0]][1];
```

```
    { for (stg=0; stg < stageNo; stg++)
       { for (m=0; m <= modelNo[stg]; m++)
         { sn = stateNo[stg][m];
            for (s=sn-2; s > 0; s--) /* for state 3,2,1 or 1(silence) */
            { accum0 = Delta[stg][m][s]+Model[mId[stg][m]].Trans[s][s];
              accum1 = Delta[stg][m][s-1]+Model[mId[stg][m]].Trans[s-1][s]
              Delta[stg][m][s] = Max(accum0,accum1)+B_O[t][mId[stg][m]][s]
            }
            Delta[stg][m][sn-1] =     /* for state 4 or 2(silence) */
                        Delta[stg][m][sn-2]+Model[mId[stg][m]].Trans[sn-2]
            if (m > 0)        /* for state 0 but m > 0 */
              Delta[stg][m][0] = Delta[stg][m-1][sn-1];
         }
       }
       SilDelta += (Model[0].Trans[1][1]+B_O[t][0][1]);
       /* for stg = 0 */
       Delta[0][0][0] = SilDelta + Model[0].Trans[1][2];
       for (stg=1; stg < stageNo; stg++)
       { mn = modelNo[stg-1];
         sn0 = stateNo[stg-1][mn];
         sn1 = stateNo[stg-1][mn-1];
         Delta[stg][0][0] = Max(Delta[stg-1][mn][sn0-1],/* for state 0 */
                                Delta[stg-1][mn-1][sn1-1]);
       }
    } /* end for t=1 ...*/
    stg = stageNo-1;
    mn = modelNo[stg];
    Deltaout = Max(Delta[stg][mn][stateNo[stg][mn]-1],
                   Delta[stg][mn-1][stateNo[stg][mn-1]-1]);
    sort_prob(Deltaout,n,Ntop);
  } /* end for (i=0; i < Nbest;...*/
  return;
} sort_prob( lprob, seq, Nsize )
float lprob;
int seq,Nsize;
{
    float  sm ;
    int    i,j,k ;

for( i = 0 ; i < Nsize ; i++ ) {
        if( lprob > s_ls[ i ].prob ) {
            for( k = Nsize-1 ; k > i ; k-- ) {
                s_ls[ k ].id = s_ls[ k-1 ].id ;
                s_ls[ k ].prob = s_ls[ k-1 ].prob;
            }
            s_ls[ i ].id = seq ;
            s_ls[ i ].prob = lprob ;
            break ;
        }
    }
}
```

What is claimed is:

1. A method for fast speech recognition of Mandarin words, comprising the steps of
   (a) obtaining a first database which is a vocabulary of N Mandarin phrases, said vocabulary is described as $W=\{W_1, W_2, \ldots, W_N\}$, each of said phrase $W_i$ is described by an acoustic model $M_i$, which is formed by concatenating word models of $\{C_1, C_2, C_3, \ldots\}$, and each word model $C_i$ is a concatenation of an initial model and a final model, wherein said initial model may be a null element, and both of said initial model and said final model are presented by a probability model;
   (b) obtaining a second database which contains J initial models, $m^I_j(j=1,2, \ldots, J)$, and K final models, $m^F_k$ ($k=1,2, \ldots, K$);
   (c) receiving an input speech signal A;
   (d) segmenting said input speech signal into l syllable segments, wherein l is an integer, such that said input signal is represented by the following formula:

$$A=(s^I_1 s^F_1)(s^I_2 s^F_2) \ldots (s^I_l s^F_l)$$

wherein $s^I_i(i=1,2,\ldots,l)$ is the ith initial syllable sub-segment, $s^F_i(i=1,2,\ldots,l)$ is the ith final syllable sub-segment and one or more of said initial syllable sub-segments may be null elements;
   (e) for every word $W_n$ in W with length l wherein $W_n$ is represented by an acoustic model $M_n(=[m^I_{j1}]m^F_{k1}[m^I_{j2}]m^F_{k2} \ldots [m^I_{jl}]m^F_{kl})$, calculating a preliminary logarithmic probability, log Prob ($W_n$), according to the following formula:

$$\log \text{Prob}(W_n) = \sum_{i=1}^{l} (\log \text{Prob}(s^I_i/m^I_{ji}) + \log \text{Prob}(s^F_i/m^F_{ki}))$$

(f) establishing a sub-set of said vocabulary designated as W', which comprises accustic models with X highest values of log Prob($W_n$);
   (g) for each $W_n$ in W', calculating the probabilities of A|$M_n$(n=1,2, ... X); and
   (h) outputing recognized phrase $W_x$, wherein $$x=\arg{.}\text{Max}(\text{Prob}(A|M_n)), n=1,2, \ldots X.$$

2. The method for fast speech recognition of Mandarin words according to claim 1 wherein both of said initial model and said final model are presented by a hidden Markov model.

3. The method for fast speech recognition of Mandarin words according to claim 1 wherein said input signal is segmented using a Viterbi algorithm.

4. The method for fast speech recognition of Mandarin words according to claim 1 which further comprises the steps of repeating steps (d) and (e) using a different l.

5. The method for fast speech recognition of Mandarin words according to claim 4 wherein said l's are 2, 3, and 4.

6. The method for fast speech recognition of Mandarin words according to claim 1 wherein said X is an interger equal to or greater than 10.

7. The method for fast speech recognition of Mandarin words according to claim 1 wherein said X is an interger and is at least 2% of said N.

8. An article of manufacture for fast speech recognition of Mandrain words, comprising:
   (a) code means for accessing and retriving data from a a first database, wherein said first database is a vocabulary of N Mandrain phrases, said vocabulary is described as $W=\{W_1, W_2, \ldots W_N\}$, each of said phrase $W_i$ is described by an acoustic model $M_i$, which is formed by concatenating word models of $\{C_1, C_2, C_3 \ldots\}$, and each word model $C_i$ is a concatenation of an initial model and a final model, wherein said initial model may be a null element, and both of said initial model and said final model are presented by a probability model;
   (b) code means for accessing and retrieving data from a second database, wherein said second database contains J initial models, $m^I_j(j=1,2, \ldots, J)$, and K final models $m^F_k$(k=1, 2, ..., K);
   (c) code means for receiving an input speech signal A;
   (d) code means for segmenting said input speech signal into l syllable segments, wherein l is an integer, such that said input signal is represented by the following formula:

$$A=(s^I_1 s^F_1)(s^I_2 s^F_2) \ldots (s^I_l s^F_l)$$

wherein $s^I_i(i=1,2, \ldots, l)$ is the ith initial syllable sub-segment, $s^F_i(i=1,2, \ldots, l)$ is the ith final syllable sub-segment, and one or more of said initial syllable sub-segments may be null elements;
   (e) code means for calculating a preliminary logarithmic probability, log Prob ($W_n$), for every word $W_n$ in W with length l wherein $W_n$ is represented by an acoustic model $M_n$ $(=[m^I_{j1}]m^F_{k1}[m^I_{j2}]m^F_{k2} \ldots [m^I_{jl}]m^F_{kl})$, according to the following formula:

$$\log \text{Prob}(W_n) = \sum_{i=1}^{l} (\log \text{Prob}(s^I_i/m^I_{ji}) + \log \text{Prob}(s^F_i/m^F_{ki}))$$

(f) code means for establishing and storing a sub-set of said vocabulary designated as W', which comprises accustic models with X highest values of log Prob($W_n$);
   (g) code means for calculating the probabilities of A|$M_n$ (n=1,2, ... X) for each $W_n$ in W'; and
   (h) code means for output ing recognizing phrase $W_x$, wherein $$x=\arg{.}\text{Max}(\text{prob}(A|M_n)), n=1,2, \ldots X.$$

9. The article of manufacture for fast speech recognition of Mandrain words according to claim 8 wherein both of said initial model and said final model are presented by a hidden Markov model.

10. The article of manufacture for fast speech recognition of Mandrain words according to claim 8 wherein said input signal is segmented using a Viterbi algorithm.

11. The article of manufacture for fast speech recognition of Mandrain words according to claim 8 which further comprises the steps of repeating steps (d) and (e) using a different l.

12. The article of manufacture for fast speech recognition of Mandrain words according to claim 11 wherein said l's are 2, 3, and 4.

13. The article of manufacture for fast speech recognition of Mandrain words according to claim 8 wherein said X is an interger equal to or greater than 10.

14. The article of manufacture for fast speech recognition of Mandrain words according to claim 8 wherein said X is an interger and is at least 2% of said N.

15. An apparatus for fast speech recognition of Mandrain words, comprising:

(a) first memory means for storing a a first database, wherein said first database is a vocabulary of N Mandrain phrases, said vocabulary is described as $W=\{W_1, W_2, \ldots W_N\}$, each of said phrase $W_i$ is described by an acoustic model $M_i$, which is formed by concatenating word models of $\{C_1, C_2, C_3 \ldots\}$, and each word model $C_i$ is a concatenation of an initial model and a final model, wherein said initial model may be a null element, and both of said initial model and said final model are presented by a probability model;

(b) second memory means for storing a second database, wherein said second database contains J initial models, $m^I_j(j=1,2,\ldots,J)$, and K final models, $m^F_k(k=1,2,\ldots,K)$;

(c) means for receiving an input speech signal A;

(d) means for segmenting said input speech signal into l syllable segments, wherein l is an integer, such that said input signal is represented by the following formula:

$$A=(s^I_1 s^F_1)(s^I_2 s^F_2) \ldots (s^I_l s^F_l)$$

wherein $s^I_i(i=1,2,\ldots,l)$ is the ith initial syllable sub-segment, $s^F_i(i=1,2,\ldots,l)$ is the ith final syllable sub-segment, and one or more of said initial syllable sub-segments may be null elements;

(e) means for accessing said second memory means and calculating a preliminary logarithmic probability, log Prob ($W_n$) for every word $W_n$ in W with length l, wherein $W_n$ is represented by an acoustic model $M_n(=[m^I_{j1}]m^F_{k1}[M^I_{j2}]m^F_{k2} \ldots [m^I_{jl}]m^F_{kl})$, according to the following formula:

$$\log Prob(W_n) = \sum_{i=1}^{l} (\log Prob(s^I_i|m^I_{ji}) + \log Prob(s^F_i|m^F_{ki}))$$

(f) means for establishing and storing a sub-set of said vocabulary designated as W', which comprises accustic models with X highest values of log Prob($W_n$);

(g) means for accessing said first memory means and calculating the probabilities of A|M$_n$ (n=1, 2, ...., X) for each $W_n$ in W'; and (h) output means for output ing recognized phrase $W_x$, wherein $$x=\arg_x Max(Prob(A|M_n)), n=1,2,\ldots X.$$

16. The article of manufacture for fast speech recognition of Mandrain words according to claim 15 wherein both of said initial model and said final model are presented by a hidden Markov model.

17. The article of manufacture for fast speech recognition of Mandrain words according to claim 15 wherein said input signal is segmented using a Viterbi algorithm.

18. The article of manufacture for fast speech recognition of Mandrain words according to claim 15 which further comprises the steps of repeating steps (c) and (d) using a different l.

19. The article of manufacture for fast speech recognition of Mandrain words according to claim 15 wherein said X is an interger equal to or greater than 10.

20. The article of manufacture for fast speech recognition of Mandrain words according to claim 15 wherein said X is an interger equal to or greater than 2% of said N.

* * * * *